US012462718B2

(12) United States Patent
Lee et al.

(10) Patent No.: US 12,462,718 B2
(45) Date of Patent: Nov. 4, 2025

(54) DISPLAY DEVICE AND METHOD FOR DETECTING DATA LINK LINE DEFECT IN DISPLAY DEVICE

(71) Applicant: LG Display Co., Ltd., Seoul (KR)

(72) Inventors: Jun-Yeob Lee, Gyeongsan-si (KR); Sang-Yong Woo, Daegu (KR); Sang-Bum Ko, Gumi-si (KR); Man-Ki Ji, Daegu (KR)

(73) Assignee: LG Display Co., Ltd (KR)

( * ) Notice: Subject to any disclaimer, the term of this patent is extended or adjusted under 35 U.S.C. 154(b) by 0 days.

(21) Appl. No.: 17/006,457

(22) Filed: Aug. 28, 2020

(65) Prior Publication Data

US 2021/0142702 A1 May 13, 2021

(30) Foreign Application Priority Data

Nov. 7, 2019 (KR) ........................ 10-2019-0141734

(51) Int. Cl.
*G09G 3/36* (2006.01)
*G09G 3/00* (2006.01)

(52) U.S. Cl.
CPC ........... *G09G 3/006* (2013.01); *G09G 3/3688* (2013.01); *G09G 2310/0297* (2013.01); *G09G 2310/08* (2013.01); *G09G 2330/12* (2013.01)

(58) Field of Classification Search
CPC ........ G09G 3/006; G09G 3/36; G09G 3/3611; G09G 3/3622; G09G 3/3625; G09G 3/364; G09G 3/3648; G09G 3/3677; G09G 3/3681; G09G 3/3685; G09G 3/3688; G09G 3/3692; G09G 2330/12

(Continued)

(56) References Cited

U.S. PATENT DOCUMENTS 5,892,493 A * 4/1999 Enami .................. G09G 3/3688 345/94
10,861,396 B2 * 12/2020 Zhao .................... H10K 59/353

(Continued)

FOREIGN PATENT DOCUMENTS

CA 103137050 A 6/2013
CN 1648677 A 8/2005

(Continued)

OTHER PUBLICATIONS

Chinese Office Action dated Nov. 13, 2023 issued in Patent Application No. 202010910091.8 w/English Translation (19 pages).

(Continued)

*Primary Examiner* — Ke Xiao
*Assistant Examiner* — Nelson Lam
(74) *Attorney, Agent, or Firm* — Fish & Richardson P.C.

(57) ABSTRACT

A display device includes a display panel divided into a display area and a non-display area such that data lines and gate lines are arranged in the display area in an intersecting manner, thereby defining pixels in a matrix, a multiplexer disposed in the non-display area of the display panel at one side of the data lines, an auto-probe (AP) test circuit disposed in the non-display area of the display panel at the other side of the data lines, and a data driver for supplying a data voltage to the data lines of the display panel through the multiplexer. The multiplexer and the AP test circuit may detect a defect of a link line connected to each data line.

11 Claims, 5 Drawing Sheets

(58) Field of Classification Search
USPC .................................................... 345/87–104
See application file for complete search history.

(56) References Cited

U.S. PATENT DOCUMENTS

| | | | | |
|---|---|---|---|---|
| 11,276,339 | B2 * | 3/2022 | Kim | G09G 3/2074 |
| 2005/0165529 | A1 * | 7/2005 | Kumazawa | G01R 31/2829 701/45 |
| 2006/0125754 | A1 * | 6/2006 | Rao | G09G 3/3648 345/93 |
| 2006/0256052 | A1 * | 11/2006 | Udo | G09G 3/006 345/87 |
| 2007/0040983 | A1 * | 2/2007 | Ishii | G02F 1/1345 349/152 |
| 2007/0046316 | A1 * | 3/2007 | Uei | G09G 3/006 324/760.01 |
| 2008/0007504 | A1 * | 1/2008 | Kawaura | G09G 3/006 345/904 |
| 2008/0180592 | A1 * | 7/2008 | Yu | G09G 3/3677 349/54 |
| 2009/0267877 | A1 * | 10/2009 | Yen | G09G 3/3648 345/87 |
| 2010/0109693 | A1 * | 5/2010 | Lee | G09G 3/006 324/760.01 |
| 2011/0043500 | A1 | 2/2011 | Kwak et al. | |
| 2011/0050675 | A1 * | 3/2011 | Osada | G09G 3/006 345/211 |
| 2013/0141314 | A1 * | 6/2013 | Ka | G09G 3/3233 345/55 |
| 2014/0104251 | A1 * | 4/2014 | Zhang | G09G 3/3611 345/205 |
| 2014/0145739 | A1 * | 5/2014 | Park | G09G 3/006 324/762.09 |
| 2014/0145744 | A1 * | 5/2014 | Shen | G09G 3/006 324/760.02 |
| 2016/0140935 | A1 * | 5/2016 | Hwang | G09G 5/18 345/204 |
| 2016/0260367 | A1 * | 9/2016 | Kwak | G09G 3/006 |
| 2016/0322011 | A1 * | 11/2016 | Park | G09G 3/3611 |
| 2016/0379906 | A1 * | 12/2016 | Kim | G09G 3/3688 257/48 |
| 2019/0130802 | A1 * | 5/2019 | Dai | G09G 3/3648 |
| 2019/0213936 | A1 * | 7/2019 | Cho | G01R 31/52 |
| 2020/0342807 | A1 * | 10/2020 | Li | G09G 3/006 |
| 2021/0020082 | A1 * | 1/2021 | Wang | H01L 22/32 |
| 2022/0076599 | A1 * | 3/2022 | Akyol | G09G 3/3233 |

FOREIGN PATENT DOCUMENTS

| | | | |
|---|---|---|---|
| CN | 201413440 | Y | 2/2010 |
| CN | 102687188 | A | 9/2012 |
| CN | 103839503 | A | 6/2014 |
| CN | 106291999 | A | 1/2017 |
| KR | 10-2014-0066340 | A | 6/2014 |
| KR | 10-2017-0000884 | A | 1/2017 |
| KR | 10-2018-0025507 | A | 3/2018 |

OTHER PUBLICATIONS

Korean Office Action dated Nov. 10, 2023 issued in Patent Application No. 10-2019-0141734 (6 pages).

Chinese Office Action dated May 9, 2024 issued in Patent Application No. 202010910091.8 w/English Translation (12 pages).

* cited by examiner

DISPLAY DEVICE AND METHOD FOR DETECTING DATA LINK LINE DEFECT IN DISPLAY DEVICE

CROSS-REFERENCE TO RELATED APPLICATION

This application claims the benefit of Korean Patent Application No. 10-2019-0141734 filed on Nov. 7, 2019, which is hereby incorporated by reference in its entirety.

BACKGROUND

Field of the Disclosure

The present disclosure relates to a display device, and more particularly to a display device and a link line defect detection method which are capable of detecting a defect of a data link line.

Description of the Background

In accordance with recent progress of information-dependent society, diverse demands for flat display devices configured to display an image have increased. In recent years, flat display devices such as a liquid crystal display (LCD) device and an organic light emitting display (OLED) device have been used.

Manufacturing processes for an LCD device include a substrate cleaning process, a substrate patterning process, an alignment film forming/rubbing process, a substrate assembly process, a liquid crystal dropping process, a driving circuit mounting process, a test process, a repair process, and a liquid crystal module assembly process.

In the substrate cleaning process, foreign matter contaminating surfaces of an upper glass substrate and a lower glass substrate in a display panel is removed using a cleaning solution.

In the substrate patterning process, signal lines including data lines and gate lines, thin film transistors (TFTs), pixel electrodes, a common electrode, etc. are formed on the lower glass substrate. In addition, a black matrix, color filters, etc. are formed on the upper glass substrate.

In the alignment film forming/rubbing process, alignment films are coated on the glass substrates, respectively, and the alignment films are rubbed using a rubbing cloth or are subjected to photo-alignment treatment.

Through the above-mentioned successive processes, a TFT array is formed on the lower glass substrate. The TFT array includes data lines, to which a video data voltage is supplied, gate lines, which intersect with the data lines and to which a scan signal, that is, a gate pulse, is sequentially supplied, TFTs formed at intersections of the data lines and the gate lines, pixel electrodes respectively connected to the TFTs, storage capacitors, etc. The common electrode is formed on the upper glass substrate in a vertical electric field driving system in which liquid crystals are driven in a twisted nematic (TN) mode or a vertical alignment (VA) mode. On the other hand, in a horizontal electric field driving system in which liquid crystals are driven in an in-plane switching (IPS) mode or a fringe-field switching (FFS) mode, the common electrode is formed on the lower glass substrate, together with the pixel electrodes. Polarization plates are bonded to the upper and lower glass substrates, respectively.

In the substrate assembly process and the liquid crystal dropping process, a sealant is drawn on one of the upper and lower glass substrates, and liquid crystals are then dropped. Thereafter, the upper glass substrate and the lower glass substrate are bonded by the sealant. The resultant liquid crystal layer is defined as a liquid crystal region defined by the sealant.

In the driving circuit mounting process, an integrated circuit (IC), in which a data driving circuit is integrated, is bonded to data pads of a display panel by an anisotropic conductive film (ACF) using a chip-on-glass (COG) process or a tape automated bonding (TAB) process. A gate driving circuit may be directly formed on the lower glass substrate using a gate-in-panel (GIP) process, or may be bonded to gate pads of the display panel using a TAB process in the driving circuit mounting process. In the driving circuit mounting process, ICs and a printed circuit board (PCB) are connected to a flexible circuit board such as a flexible printed circuit board (FPCB) or a flexible flat cable (FFC).

The process includes a test for the driving circuits, a line test for the data lines, gate lines, etc. formed on the TFT array substrate, a test conducted after formation of the pixel electrodes, an electrical test conducted after substrate assembly and liquid crystal dropping, a turn-on test, etc. In the repair process, defects found in the test process are repaired.

After completion of the display panel through execution of the above-mentioned successive processes, the liquid crystal module assembly process is carried out. In the liquid crystal module assembly process, a backlight unit is aligned beneath the display panel, and the display panel and the backlight unit are assembled using a tool such as a guide/case member.

An auto-probe test may be carried out. In the auto-probe test, a turn-on test is executed for a substrate of the display panel before execution of the driving circuit mounting process in order to inspect a signal line defect or a thin film pattern defect on the substrate.

Disposed on the lower glass substrate in order to enable execution of the auto-probe test are an auto-probe test pad (hereinafter referred to as an "AP pad") to contact a needle of an auto-probe test device and a signal line (hereinafter referred to as an "AP line") to be connected to the AP pad, and AP switches each connected between the AP line and a corresponding one of the data lines.

Meanwhile, a multiplexer (MUX) is formed on the TFT array substrate in order to reduce the number of output pins of the data driving circuit. The multiplexer is disposed between the data driving circuit and the data lines.

That is, output channels of the data driving circuit are connected to the data lines, respectively, through the multiplexer. The data driving circuit receives image data from a timing controller, converts the received image data into an analog voltage under control of the timing controller, and outputs the converted analog voltage as a data voltage. Under control of the timing controller, the multiplexer distributes the data voltage output from the data driving circuit. When the multiplexer is a 1:3 multiplexer, the multiplexer time-divides a data voltage output through one output channel of the data driving circuit and, as such, supplies the time-divided data voltage to three data lines. Accordingly, when such a 1:3 multiplexer is used, the number of output pins in the data driving circuit may be reduced to ⅓.

In conventional auto-probe test methods, however, it may be impossible to conduct an open/short test for data link lines connecting data pads and data lines.

SUMMARY

Accordingly, the present disclosure is directed to a display device and a method for detecting a data link line defect in the display device that substantially obviate one or more problems due to limitations and disadvantages of the related art.

In addition, the present disclosure provides a display device and a link line defect detection method which are capable of detecting a defect of a data link line using auto-probe (AP) switches for an AP test and a multiplexer configured to reduce the number of output pins in a data driving circuit.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, a display device includes a display panel divided into a display area and a non-display area such that data lines and gate lines are arranged in the display area in an intersecting manner, thereby defining pixels in a matrix, a multiplexer disposed in the non-display area of the display panel at one side of the data lines, an auto-probe (AP) test circuit disposed in the non-display area of the display panel at the other side of the data lines, and a data driver for supplying a data voltage to the data lines of the display panel through the multiplexer, wherein the multiplexer and the AP test circuit detect defects of link lines respectively connected to the data lines.

The AP test circuit may include a plurality of AP pads, and a plurality of AP switching elements connected between the data lines and the plurality of AP pads. The plurality of AP switching elements may be turned on when an AP test and a defect inspection for the link lines are conducted.

When the defect inspection for the link lines is conducted, a positive (+) data voltage may be applied to odd numbered AP pads among the plurality of AP pads, and a negative (−) data voltage may be applied to even numbered AP pads among the plurality of AP pads.

The multiplexer may include a plurality of first multiplexer switching elements connected between each channel of the data driver and (3n−2)th data lines, and controlled by a first multiplexer (MUX) control signal, wherein n is a natural number, a plurality of second multiplexer switching elements connected between each channel of the data driver and (3n−1)th data lines, and controlled by a second MUX control signal, and a plurality of third multiplexer switching elements connected between each channel of the data driver and (3n)th data lines, and controlled by a third MUX control signal. When the defect inspection for the link lines is conducted, the multiplexer may turn on the first multiplexer switching elements to drive the display panel, and detects an image darkly displayed in the form of a dark line on the display panel, may turn on the second multiplexer switching elements to drive the display panel, and detects an image darkly displayed in the form of a dark line on the display panel, and may turn on the third multiplexer switching elements to drive the display panel, and may detect an image darkly displayed in the form of a dark line on the display panel.

The multiplexer may include a plurality of first multiplexer switching elements connected between each channel of the data driver and (3n−2)th data lines, and controlled by a first multiplexer (MUX) control signal, wherein n is a natural number, a plurality of second multiplexer switching elements connected between each channel of the data driver and (3n−1)th data lines, and controlled by a second MUX control signal, and a plurality of third multiplexer switching elements connected between each channel of the data driver and (3n)th data lines, and controlled by a third MUX control signal. When the defect inspection for the link lines is conducted, the multiplexer may turn on all of the first to third multiplexer switching elements to drive the display panel, and may detect an image displayed in the form of a black block on the display panel.

The multiplexer may include a plurality of first multiplexer switching elements connected between each channel of the data driver and (2n−1)th data lines, and controlled by a first multiplexer (MUX) control signal, wherein n is a natural number, and a plurality of second multiplexer switching elements connected between each channel of the data driver and (2n)th data lines, and controlled by a second MUX control signal. When the defect inspection for the link lines is conducted, the multiplexer may turn on all of the first and second multiplexer switching elements to drive the display panel, and may detect an image darkly displayed in the form of a black block on the display panel.

When defect inspection for the link lines is conducted, data voltages are applied to the plurality of AP pads, respectively, and all of the switching elements of the multiplexer may be turned on to drive the display panel such that detection of an image displayed in the form of a bright line on the display panel is conducted.

In another aspect of the present disclosure, there is provided a method for detecting a data link line defect in a display device, in which a multiplexer and an auto-probe (AP) test circuit are disposed in a non-display area of a display panel at opposite sides of data lines, respectively, includes turning on all of a plurality of AP switching elements in the AP test circuit and applying a positive (+) data voltage to odd numbered AP pads among a plurality of AP pads in the AP test circuit while applying a negative (−) data voltage to even numbered AP pads among the plurality of AP pads, and turning on all switching elements of the multiplexer to drive the display panel and detecting an image darkly displayed in the form of a black block on the display panel.

When the multiplexer includes a plurality of first multiplexer switching elements connected between each channel of a data driver and (3n−2)th data lines, and controlled by a first multiplexer (MUX) control signal, a plurality of second multiplexer switching elements connected between each channel of the data driver and (3n−1)th data lines, and controlled by a second MUX control signal, and a plurality of third multiplexer switching elements connected between each channel of the data driver and (3n)th data lines, and controlled by a third MUX control signal, the multiplexer may turn on the first multiplexer switching elements to drive the display panel, and may detect an image darkly displayed in the form of a dark line on the display panel, wherein n is a natural number. In this case, the multiplexer may turn on the second multiplexer switching elements to drive the display panel, and may detect an image darkly displayed in the form of a dark line on the display panel. In addition, the multiplexer may turn on the third multiplexer switching elements to drive the display panel, and may detect an image darkly displayed in the form of a dark line on the display panel.

In another aspect of the present disclosure, a method for detecting a data link line defect in a display device, in which a multiplexer and an auto-probe (AP) test circuit are disposed in a non-display area of a display panel at opposite sides of data lines, respectively, includes turning on all of a plurality of AP switching elements in the AP test circuit to apply data voltages to a plurality of AP pads of the AP test circuit, respectively, and turning on all switching elements of the multiplexer to drive the display panel, and detecting an image displayed in the form of a bright line on the display panel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the present disclosure, illustrate aspect(s) of the disclosure and along with the description serve to explain the principle of the disclosure.

In the drawings.

DETAILED DESCRIPTION

Figure 1:
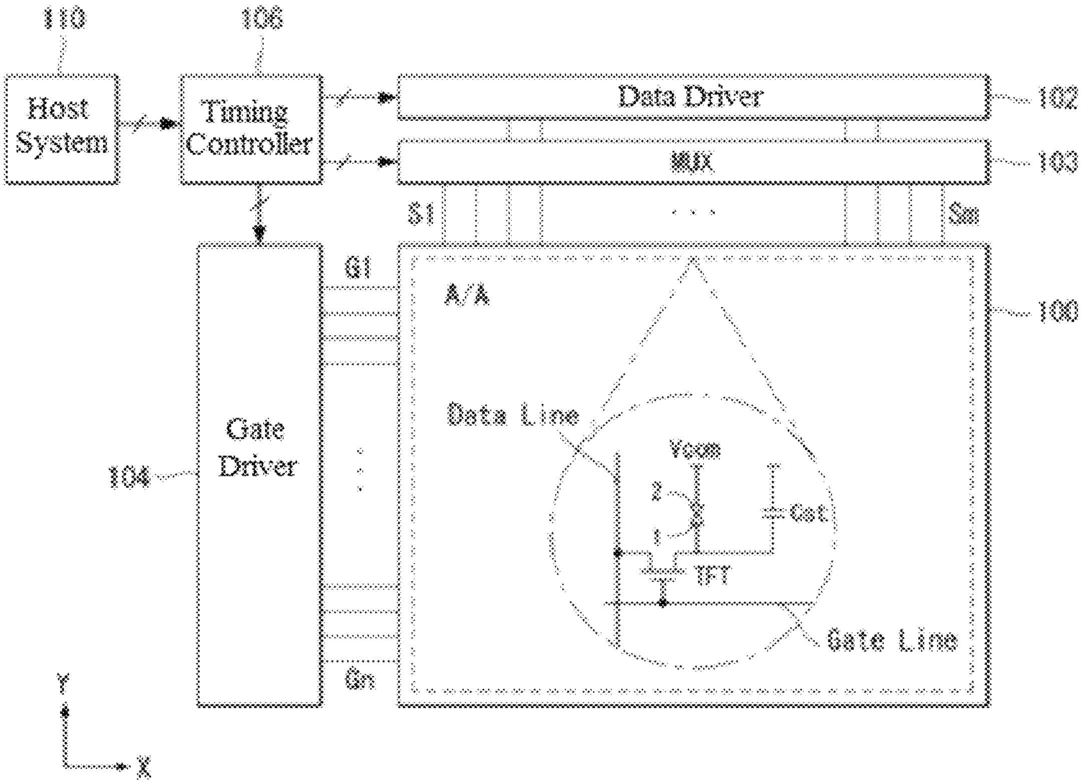
FIG. 1 is a block diagram of a display device according to an exemplary aspect of the present disclosure.

The same reference numerals described throughout the specification designate substantially the same elements. In the following description, no detailed description may be given of configurations and functions that are irrelevant to the essentials of the present disclosure and are known to those skilled in the art. Meaning of terminologies used in the specification should be understood as follows.

Advantages and features of the present disclosure, and implementation methods thereof will be clarified through following aspects described with reference to the accompanying drawings. However, the present disclosure may be embodied in different forms and should not be construed as limited to the aspects set forth herein. Rather, these aspects are provided so that the present disclosure will be thorough and complete, and will fully convey the scope of the disclosure to those skilled in the art. Further, the present disclosure is defined only by the categories of the claims.

A shape, a size, a ratio, an angle, and a number disclosed in the drawings for describing aspects of the present disclosure are merely an example, and thus, the present disclosure is not limited to the illustrated details. The same reference numerals designate substantially the same elements throughout the specification. In the following description, when the detailed description of the relevant known function or configuration is determined to unnecessarily obscure the gist of the present disclosure, the detailed description will be omitted.

When "comprise", "have", and "include" described in the specification are used, another part may be added unless "only~" is used. Terms in a singular form may include plural forms unless stated otherwise.

In construing an element, the element is construed as including a tolerance range, even if there is no explicit description.

In describing a position relationship between two elements, for example, when the position relationship is described using "upon~", "above~", "below~" and "next to~", one or more other elements may be interposed between the two elements unless "just" or "directly" is used. The case in which an element or a layer is referred to as being "on" another element or layer includes both the case in which the element is disposed directly on the other element and the case in which an intervening element is present.

In describing a temporal relationship, for example, when the temporal order is described as "after~", "subsequent~", "next~", and "before~", the case which is not continuous may also be included unless "just" or "directly" is used.

It will be understood that, although the terms "first", "second", etc. may be used herein to describe various elements, these elements should not be limited by these terms. These terms are only used to distinguish one element from another. For example, a first element referred to in the following description may represent a second element, without departing from the scope of the present disclosure.

"X-axis direction", "Y-axis direction," and "Z-axis direction" should not be construed by a geometric relation only of a mutual vertical relation, and may have broader directionality within the range that elements of the present disclosure may act functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

The following aspects may be partially or overall coupled or combined, and may be technically linked and implemented in various manners. The aspects may be independently implemented, or may be implemented in a co-dependent relationship.

Hereinafter, a display device and a link line defect detection method which are capable of detecting a link line defect in accordance with the present disclosure will be described in detail.

The display device according to the present disclosure may be embodied as a flat display device such as a liquid crystal display (LCD) device or an organic light emitting display (OLED) device.

Although the following description will be given mainly in conjunction with an LCD device as an example of a flat display device, aspects of the present disclosure are not limited thereto. For example, aspects of the present disclosure are applicable to any display device including auto-probe (AP) switches for an AP test and a multiplexer (MUX) configured to reduce the number of output pins of a data driving circuit.

FIG. 1 is a block diagram of a display device according to an exemplary aspect of the present disclosure.

As illustrated in FIG. 1, the display device according to the exemplary aspect of the present disclosure includes a display panel 100 formed with a pixel array, a driving circuit for writing data of an input image in the display panel 100, and a backlight unit (not shown) for irradiating uniform light onto the display panel 100.

The display panel 100 includes an upper substrate and a lower substrate which face each other under the condition that a liquid crystal layer is interposed between the upper substrate and the lower substrate. The pixel array includes pixels arranged in a matrix through an intersection structure of data lines S1 to Sm and gate lines G1 to Gn.

The display panel 100 includes the data lines S1 to Sm, the gate lines G1 to Gn, thin film transistors (TFTs), pixel electrodes 1 respectively connected to the TFTs, and storage capacitors Cst respectively connected to the pixel electrodes 1, all of which are formed on the lower substrate of the display panel 100. Each pixel may be divided into a red (R) sub-pixel, a green (G) sub-pixel, and a blue (B) sub-pixel. In addition, each pixel may further include a white (W) sub-pixel.

Each pixel adjusts a transmission amount of light using liquid crystal molecules driven by a voltage difference between the corresponding pixel electrode 1, which is charged with a data voltage through the corresponding TFT, and a common electrode 2 to which a common voltage Vcom is applied.

Each TFT formed on the lower substrate of the display panel 100 may be embodied using an amorphous silicon (a-Si) TFT, a low-temperature polysilicon (LTPS) TFT, an oxide TFT, or the like. The TFTs are formed at respective intersections between the data lines S1 to Sm and the gate lines G1 to Gn. Each TFT supplies a data voltage from the corresponding data line to the corresponding pixel electrode 1 in response to a gate pulse.

A color filter array including a black matrix (BM) and color filters is formed on the upper substrate of the display panel 100. The common electrode 2 may be formed on the upper substrate in a vertical electric field driving system in which liquid crystals are driven in a twisted nematic (TN) mode or a vertical alignment (VA) mode. On the other hand, in a horizontal electric field driving system in which liquid crystals are driven in an in-plane switching (IPS) mode or a fringe-field switching (FFS) mode, the common electrode 2 may be formed on the lower glass substrate, together with the pixel electrodes 1. Polarization films are attached to the upper and lower substrates of the display panel 100, respectively. Alignment films are also formed on the upper and lower substrates of the display panel 100, respectively, in order to set a pre-tilt angle of liquid crystals.

The driving circuit for the display panel 100 includes a data driver 102, a gate driver 104, and a timing controller 106. In addition, a multiplexer (MUX) 103 is formed at the display panel 100. The multiplexer 103 is disposed between the data driver 102 and the data lines S1 to S m.

Output channels of the data driver 102 are connected to the data lines S1 to Sm via the multiplexer 103. The data driver 102 receives data of an image from the timing controller 106, converts the received image data into an analog data voltage under control of the timing controller 106, and outputs the analog data voltage to the multiplexer 103.

The multiplexer 103 distributes the data voltage received from the data driver 102 to the data lines S1 to Sm under control of the timing controller 106. When the multiplexer 103 is a 1:3 multiplexer, the multiplexer 103 time-divides a data voltage received through one output channel of the data driver 102 and, as such, supplies the time-divided data voltage to three data lines. Accordingly, when such a 1:3 multiplexer is used, the number of ICs (or output pins) in the data driver 102 required to drive the display panel 100 may be reduced by ⅓.

An auto-probe test circuit (hereinafter referred to as an "AP test circuit") is disposed at a side of the display panel 100 opposite to a position where the multiplexer 103 is disposed.

Hereinafter, the multiplexer 103 and the AP test circuit, which are disposed at the display panel 100, will be described in more detail.

Figure 2:
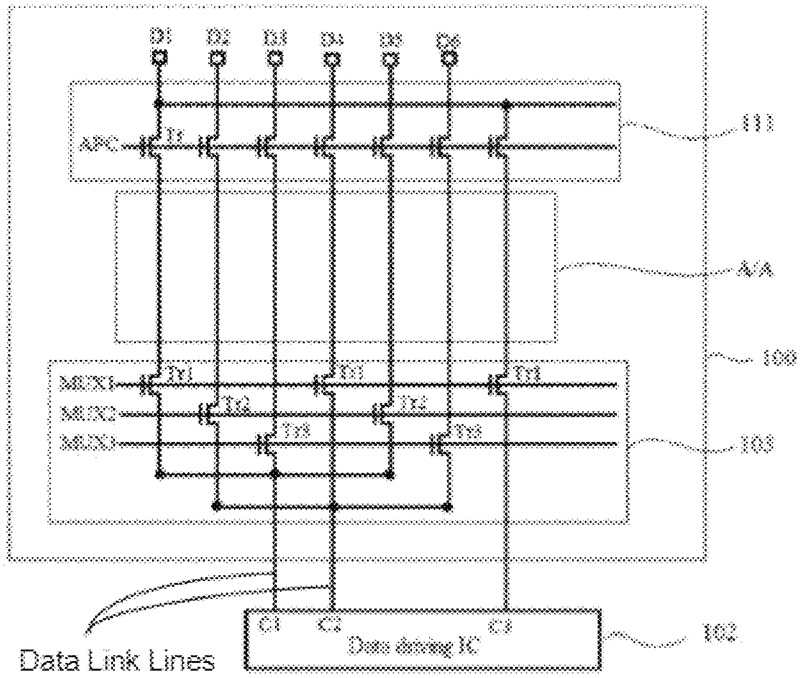
FIG. 2 is a block diagram illustrating concrete configurations of a display panel and a data driving circuit of FIG. 1 according to a first aspect of the present disclosure.

FIG. 2 is a block diagram illustrating concrete configurations of the display panel and the data driving circuit of FIG. 1 according to a first aspect of the present disclosure.

As illustrated in FIG. 2, the lower substrate constituting the display panel 100 is divided into a display area A/A and a non-display area. In the display area A/A, the data lines S1 to Sm and the gate lines G1 to Gn are arranged in an intersecting manner, as described in conjunction with FIG. 1, and, as such, define pixels in a matrix. In FIG. 2, only the data lines are shown.

The multiplexer 103 is disposed at one side of the display area A/A. An AP test circuit 111 is disposed at the other side of the display area A/A.

A data driving IC constituting the data driver 102 is connected to the display panel 100 via the multiplexer 103.

FIG. 2 illustrates an example in which the multiplexer 103 is constituted by a 1:3 multiplexer.

The 1:3 multiplexer includes a plurality of first multiplexer switching elements Tr1 connected between each channel of the data driving IC and (3n−2)th data lines and controlled by a first MUX control signal MUX1, a plurality of second multiplexer switching elements Tr2 connected between each channel of the data driving IC and (3n−1)th data lines and controlled by a second MUX control signal MUX2, and a plurality of third multiplexer switching elements Tr3 connected between each channel of the data driving IC and (3n)th data lines and controlled by a third MUX control signal MUX3.

Here, n is a natural number.

Meanwhile, the AP test circuit 111 includes a plurality of AP switching elements Tr connected between the data lines and AP pads D1 to D6 and controlled by an AP control signal APC.

In this case, the number of the AP pads D1 to D6 is six. The first AP pad D1 is connected to the (6k−5)th data lines via a corresponding one of the AP switching elements Tr. The second AP pad D2 is connected to the (6k−4)th data lines via a corresponding one of the AP switching elements Tr. The third AP pad D3 is connected to the (6k−3)th data lines via a corresponding one of the AP switching elements Tr. The fourth AP pad D4 is connected to the (6k−2)th data lines via a corresponding one of the AP switching elements Tr. The fifth AP pad D5 is connected to the (6k−1)th data lines via a corresponding one of the AP switching elements Tr. The sixth AP pad D6 is connected to the (6k)th data lines via a corresponding one of the AP switching elements Tr.

As described in conjunction with FIG. 2, (6k−5)th data lines are connected to odd numbered channels of the data driving IC via a corresponding one of the first multiplexer switching elements Tr1. (6k−4)th data lines are connected to even numbered channels of the data driving IC via a corresponding one of the second multiplexer switching elements Tr2. (6k−3)th data lines are connected to odd numbered channels of the data driving IC via a corresponding one of the third multiplexer switching elements Tr3. (6k−2)th data lines are connected to even numbered channels of the data driving IC via a corresponding one of the first multiplexer switching elements Tr1. (6k−1)th data lines are connected to odd numbered channels of the data driving IC via a corresponding one of the second multiplexer switching elements Tr2. (6k)th data lines are connected to even numbered channels of the data driving IC via a corresponding one of the third multiplexer switching elements Tr3.

Here, k is a natural number.

Meanwhile, although the multiplexer 103 has been described in conjunction with a 1:3 multiplexer with reference to FIG. 2, the multiplexer 103 may be configured as a 1:2 multiplexer.

Figure 3:
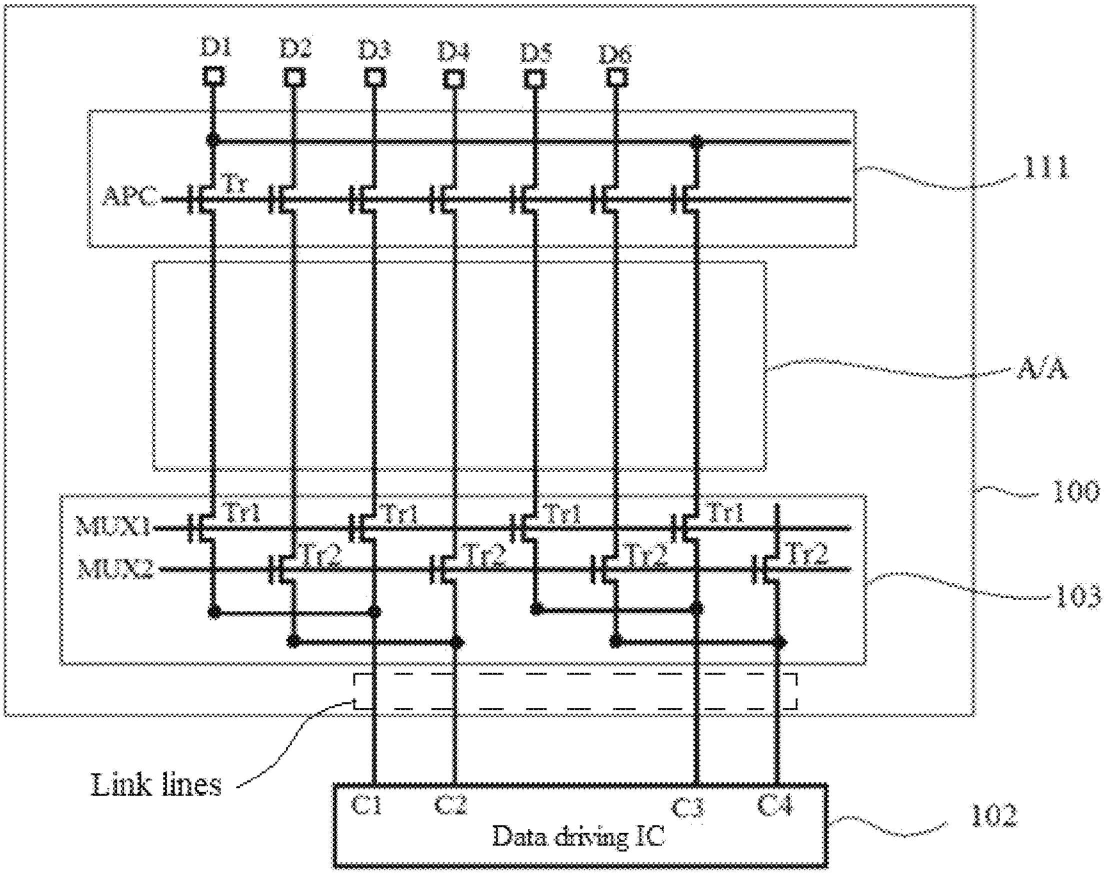
FIG. 3 is a block diagram illustrating concrete configurations of the display panel and the data driving circuit of FIG. 1 according to a second aspect of the present disclosure.

FIG. 3 is a block diagram illustrating concrete configurations of the display panel and the data driving circuit of FIG. 1 according to a second aspect of the present disclosure.

As illustrated in FIG. 3, the lower substrate constituting the display panel 100 is divided into a display area A/A and a non-display area. In the display area A/A, the data lines S1 to Sm and the gate lines G1 to Gn are arranged in an intersecting manner, as described in conjunction with FIG. 1, and, as such, define pixels in a matrix. In FIG. 3, only the data lines are shown.

The multiplexer 103 is disposed at one side of the display area A/A. An AP test circuit 111 is disposed at the other side of the display area A/A.

A data driving IC constituting the data driver 102 is connected to the display panel 100 via the multiplexer 103.

FIG. 3 illustrates an example in which the multiplexer 103 is constituted by a 1:2 multiplexer.

The 1:2 multiplexer includes a plurality of first multiplexer switching elements Tr1 connected between each channel of the data driving IC and (2n−1)th data lines and controlled by a first MUX control signal MUX1, and a plurality of second multiplexer switching elements Tr2 connected between each channel of the data driving IC and (2n)th data lines and controlled by a second MUX control signal MUX2.

Meanwhile, the AP test circuit 111 includes a plurality of AP switching elements Tr connected between the data lines and AP pads D1 to D6 and controlled by an AP control signal APC, as described in conjunction with FIG. 2.

Similarly to the case of FIG. 2, the number of the AP pads D1 to D6 is six. The first AP pad D1 is connected to (6k−5)th data lines via a corresponding one of the AP switching elements Tr. The second AP pad D2 is connected to (6k−4)th data lines via a corresponding one of the AP switching elements Tr. The third AP pad D3 is connected to (6k−3)th data lines via a corresponding one of the AP switching elements Tr. The fourth AP pad D4 is connected to (6k−2)th data lines via a corresponding one of the AP switching elements Tr. The fifth AP pad D5 is connected to (6k−1)th data lines via a corresponding one of the AP switching elements Tr. The sixth AP pad D6 is connected to (6k)th data lines via a corresponding one of the AP switching elements Tr.

As described in conjunction with FIG. 3, (4k−3)th data lines are connected to odd numbered channels of the data driving IC via a corresponding one of the first multiplexer switching elements Tr1. (4k−2)th data lines are connected to even numbered channels of the data driving IC via a corresponding one of the second multiplexer switching elements Tr2. (4k−1)th data lines are connected to odd numbered channels of the data driving IC via a corresponding one of the first multiplexer switching elements Tr1. (4k)th data lines are connected to even numbered channels of the data driving IC via a corresponding one of the second multiplexer switching elements Tr2.

In the display panel 100 configured as described above, it may be possible to inspect defects of the data lines or defects of the thin film transistors by conducting a turn-on test for the substrate of the display panel 100 using the AP test circuit 111, before execution of a driving circuit mounting process.

That is, the display panel 100 is driven through supply of a data voltage to all of the AP pads D1 to D6 in the AP test circuit 111 in a state in which all of the switching elements Tr1 to Tr3 in the multiplexer 103 are turned off.

Under the condition that the first AP pad D1 is assumed as odd-red R-O, the second AP pad D2 is assumed as even-green G-E, the third AP pad D3 is assumed as odd-blue B-O, the fourth pad D4 is assumed as even-red R-E, the fifth AP pad D5 is assumed as odd-green G-O, and the sixth AP pad D6 is assumed as even-blue B-E, color rendering is realized through adjustment of timings of data signals, that is, R, G, and B image signals, in accordance with clocks GCLK. In addition, rendering of white, black, and gray is realized by simultaneously applying the R, G, and B image signals in accordance with each clock GCLK while performing a variation in data voltage.

It may be possible to inspect data line defects or thin film transistor defects in the display panel by driving the display panel, as described above, and subsequently conducting a turn-on test (visual inspection).

In addition, the multiplexer 103 is driven in a time division manner under the condition that all switching elements Tr of the AP test circuit 111 are turned off, in order to apply desired data voltages to desired data lines, respectively.

Hereinafter, a link line defect detection method according to the present disclosure in the display device configured as described above will be described.

Figure 4:
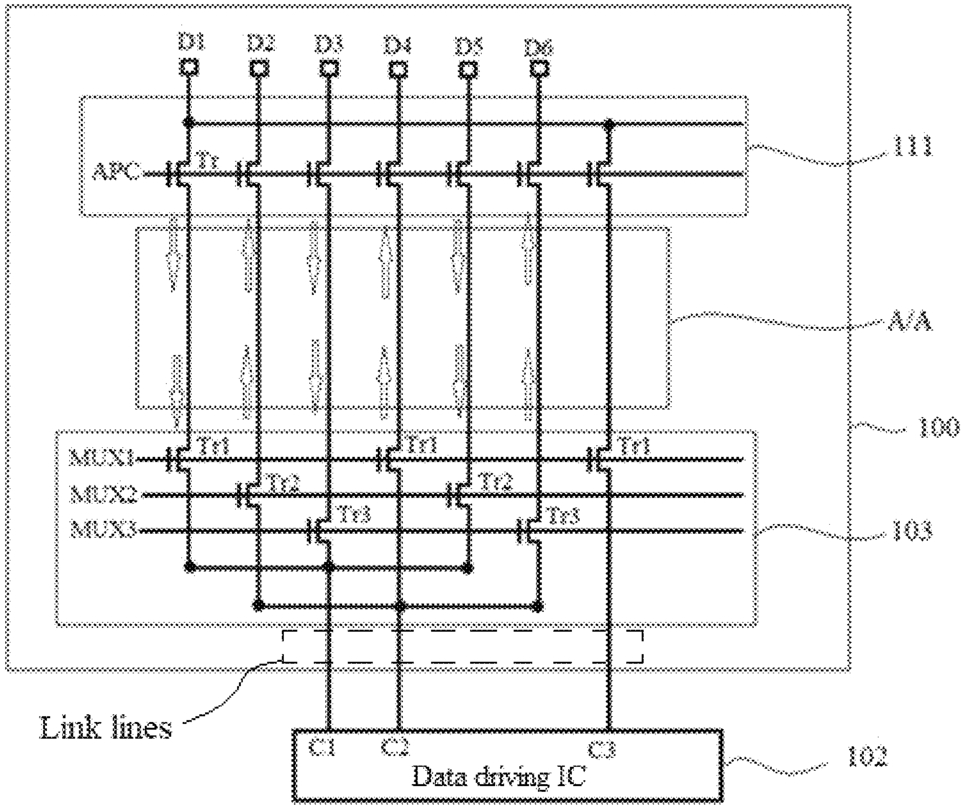
FIG. 4 is a diagram explaining a link line defect detection method carried out in the case in which a short circuit defect is generated between neighboring link lines in the display panel illustrated in FIG. 2.
Figure 5:
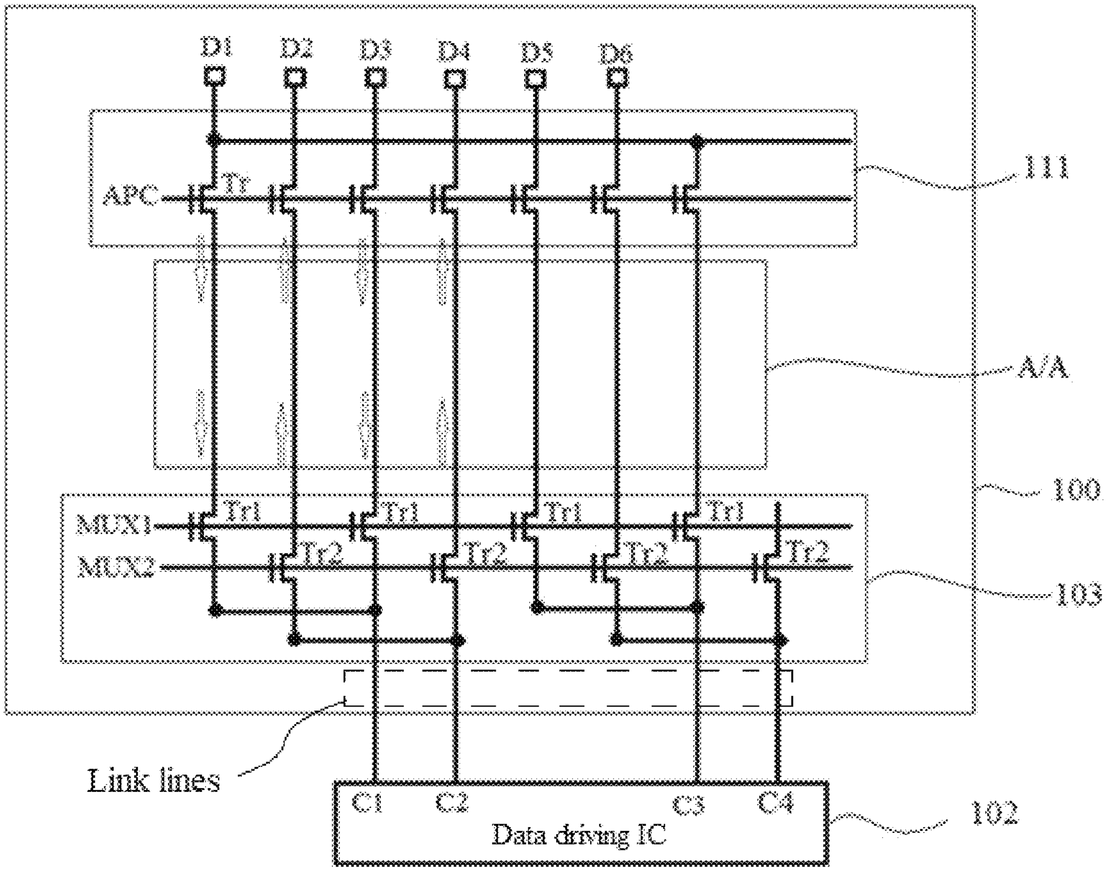
FIG. 5 is a diagram explaining a link line defect detection method carried out in the case in which a short circuit defect is generated between neighboring link lines in the display panel illustrated in FIG. 3.

FIG. 4 is a diagram explaining a link line defect detection method carried out in the case in which a short circuit defect is generated between neighboring link lines in the display panel illustrated in FIG. 2. FIG. 5 is a diagram explaining a link line defect detection method carried out in the case in which a short circuit defect is generated between neighboring link lines in the display panel illustrated in FIG. 3.

In the configuration of FIG. 2, an AP control signal APC of a high-level voltage (turning-on logic voltage) is applied to the plurality of AP switching elements Tr, thereby turning on all of the AP switching elements Tr.

Thereafter, the display panel 100 is driven by applying a positive (+) data voltage to odd numbered AP pads among the AP pads D1 to D6, that is, the odd numbered AP pads D1, D3 and D5 while applying a negative (−) data voltage to even numbered AP pads among the AP pads D1 to D6, that is, the even numbered AP pads D2, D4 and D6.

In addition, among first to third MUX control signals MUX1 to MUX3, the first MUX control signal MUX1, which is a high-level voltage (turning-on logic voltage), is applied to the first multiplexer switching elements Tr1, thereby turning on the first multiplexer switching elements Tr1.

In addition, among the first to third MUX control signals MUX1 to MUX3, the second MUX control signal MUX2, which is a high-level voltage (turning-on logic voltage), is applied to the second multiplexer switching elements Tr2, thereby turning on the second multiplexer switching elements Tr2.

In addition, among the first to third MUX control signals MUX1 to MUX3, the third MUX control signal MUX3, which is a high-level voltage (turning-on logic voltage), is applied to the third multiplexer switching elements Tr3, thereby turning on the third multiplexer switching elements Tr3.

In this state, an image signal is normally displayed on the display panel 100 in a normal case in which there is no short circuit between neighboring link lines.

However, in the case in which the link line of the first output channel C1 and the link line of the second output channel C2 neighboring each other are short-circuited to each other, the display panel 100 cannot be normally driven.

This will be described in detail. When the first MUX control signal MUX1, which is a high-level voltage (turning-on logic voltage), is applied to the first multiplexer switching elements Tr1 under the condition that a positive (+) data voltage is applied to the odd numbered AP pads D1, D3 and D5, and a negative (−) data voltage is applied to the even numbered AP pads D2, D4 and D6, thereby turning on the first multiplexer switching elements Tr1, the positive (+) data voltage applied to the first AP pad D1 and the negative (−) data voltage applied to the second AP pad D2 are offset by each other in a state in which the link line of the first output channel C1 and the link line of the second output channel C2 are short-circuited to each other, as shown in FIG. 4. In this state, the data voltages become 0V and, as such, the pixels connected to the first data line S1 and the fourth data line S4 are displayed in black (darkly displayed). As a result, the pixels display an image in the form of a dark line.

In addition, when the second MUX control signal MUX2, which is a high-level voltage (turning-on logic voltage), is applied to the second multiplexer switching elements Tr2 under the condition that the above-described data voltages are applied in the above-described manner, thereby turning on the second multiplexer switching elements Tr2, the negative (−) data voltage applied to the second AP pad D2 and the positive (+) data voltage applied to the fifth AP pad D5 are offset by each other in a state in which the link line of the first output channel C1 and the link line of the second output channel C2 are short-circuited to each other. In this state, the data voltages become 0V and, as such, the pixels connected to the second data line S2 and the fifth data line S5 are displayed in black (darkly displayed). As a result, the pixels display an image in the form of a dark line.

In addition, when the third MUX control signal MUX3, which is a high-level voltage (turning-on logic voltage), is applied to the third multiplexer switching elements Tr3 under the condition that the above-described data voltages are applied in the above-described manner, thereby turning on the third multiplexer switching elements Tr3, the positive (+) data voltage applied to the third AP pad D3 and the negative (−) data voltage applied to the sixth AP pad D6 are offset by each other in a state in which the link line of the first output channel C1 and the link line of the second output channel C2 are short-circuited to each other. In this state, the data voltages become 0V and, as such, the pixels connected to the third data line S3 and the sixth data line S6 are displayed in black (darkly displayed). As a result, the pixels display an image in the form of a dark line.

When the display panel 100 displays an image in the form of a dark line in accordance with the first to third MUX control signals MUX1 to MUX3 under the condition that a positive (+) data voltage is applied to the odd numbered AP pads D1, D3 and D5, and a negative (−) data voltage is applied to the even numbered AP pads D2, D4 and D6, it is considered that neighboring link lines are short-circuited to each other.

When the first to third MUX control signals MUX1, MUX2 and MUX3, each of which is a high-level voltage (turning-on logic voltage), are simultaneously applied to the first to third multiplexer switching elements Tr1, Tr2 and Tr3, respectively, under the condition that the above-described data voltages are applied in the above-described manner, thereby turning on all of the first to third multiplexer switching elements Tr1, Tr2 and Tr3, the positive (+) data voltages applied to the odd numbered AP pads D1, D3 and D5, and the negative (−) data voltages applied to the even numbered AP pads D2, D4 and D6 are offset to each other in a state in which the link line of the first output channel C1 and the link line of the second output channel C2 are short-circuited to each other. In this state, all of the pixels connected to the first to sixth data lines S1 to S6 are displayed in black. As a result, the pixels display an image in the form of a black block.

When the display panel 100 displays an image in the form of a black block, as described above, it is considered that neighboring link lines are short-circuited to each other.

In the configuration of FIG. 3, an AP control signal APC of a high-level voltage (turning-on logic voltage) is applied to the plurality of AP switching elements Tr, thereby turning on all of the AP switching elements Tr.

Thereafter, the display panel 100 is driven by applying a positive (+) data voltage to odd numbered AP pads among the AP pads D1 to D6, that is, the AP pads D1, D3 and D5 while applying a negative (−) data voltage to even numbered AP pads among the AP pads D1 to D6, that is, the AP pads D2, D4 and D6.

In addition, the first and second MUX control signals MUX1 and MUX2, which are high-level voltages (turning-on logic voltages), are applied to the first multiplexer switching elements Tr1 and the second multiplexer switching elements Tr2, respectively, thereby turning on the first and second multiplexer switching elements Tr1 and Tr2.

In the case in which the link line of the first output channel C1 and the link line of the second output channel C2 neighboring each other are short-circuited to each other, the display panel 100 cannot be normally driven in the above-described state.

This will be described in detail. When the first and second MUX control signals MUX1 and MUX2, which are high-level voltages (turning-on logic voltages), are applied to the first multiplexer switching elements Tr1 and the second multiplexer switching elements Tr2, respectively, under the condition that a positive (+) data voltage is applied to the odd numbered AP pads D1, D3 and D5, and a negative (−) data voltage is applied to the even numbered AP pads D2, D4 and D6, thereby turning on the first and second multiplexer switching elements Tr1 and Tr2, the positive (+) data voltage applied to the first and third AP pads D1 and D3 and the negative (−) data voltage applied to the second and fourth AP pads D2 and D4 are offset by each other in a state in which the link line of the first output channel C1 and the link line of the second output channel C2 are short-circuited to each other, as shown in FIG. 5. In this state, the data voltages become 0V and, as such, the pixels connected to the first to fourth data lines S1 to S4 are displayed in black. As a result, the pixels display an image in the form of a black block.

When the display panel 100 displays an image in the form of a black block, as described above, it is considered that neighboring link lines are short-circuited to each other.

Hereinafter, a method for detecting an open defect when the open defect is generated at one link line will be described.

When an open defect is generated at one link line, a resistance difference is generated between neighboring data lines. Accordingly, when a resistance difference is generated between neighboring data lines, it is considered that an open defect has been generated at one link line.

This will be described in detail.

In the configuration of FIG. 2 or 3, the same data voltage is applied to all of the AP pads D1 to D6, and an AP control signal APC of a high-level voltage (turning-on logic voltage) is applied to the plurality of AP switching elements Tr, thereby turning on all of the AP switching elements Tr.

Thereafter, the display panel 100 is driven by applying the first to third MUX control signals MUX1 to MUX3, which are high-level voltages (turning-on logic voltages), to the first to third multiplexer switching elements Tr1 to Tr3, respectively, thereby turning on the first to third multiplexer switching elements Tr1 to Tr3.

When the display panel is driven as described above, a resistance difference is generated between a data line connected to an opened link line and a data line connected to a non-opened link line.

When a resistance difference is generated between the data lines, as described above, a luminance difference is generated between the data lines. As a result, a visible link line defect in the form of a bright line is detected.

As described above, the multiplexer 103 and the AP test circuit 111 are disposed in the non-display area of the display panel at opposite sides of the data lines, respectively.

A turn-on test is conducted for the substrate of the display panel using the AP test circuit 111 before execution of a driving circuit mounting process, thereby inspecting a signal line defect or a thin film pattern defect on the substrate.

Furthermore, a data voltage is applied to a plurality of data lines in the display panel using the multiplexer 103 and, as such, the number of output pins of the data driving circuit may be reduced.

In addition, it may be possible to detect a short circuit or opening of a data link line using the multiplexer 103 and the AP test circuit 111.

The display device according to each aspect of the present disclosure and the data link line defect detection method in the display device according to each aspect of the present disclosure have the following effects.

The multiplexer and the AP test circuit are disposed in the non-display area of the display panel at opposite sides of the data lines, and the data driving circuit is connected to the display panel via the multiplexer.

In accordance with these configurations, before execution of a driving circuit mounting process, it may be possible to inspect a data line defect or a thin film transistor defect in the display panel by conducting a turn-on test for the substrate of the display panel using the AP test circuit.

In addition, data voltages are applied to the plurality of data lines of the display panel using the multiplexer and, as such, the number of output pins of the data driving circuit may be reduced.

Furthermore, it may be possible to detect a short circuit or opening of data link lines using the multiplexer and the AP test circuit.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display device comprising:

a display panel divided into a display area and a non-display area such that data lines and gate lines are arranged in the display area in an intersecting manner for defining pixels in a matrix;

a multiplexer disposed in the non-display area of the display panel at one side of the data lines and including a plurality of multiplexer switching elements;

an auto-probe (AP) test circuit disposed in the non-display area of the display panel at another side of the data lines; and a data driver for supplying a data voltage to the data lines of the display panel through the multiplexer, wherein the multiplexer and the AP test circuit detect defects of link lines respectively connected to the data lines, wherein, before execution of a driving circuit mounting process, the AP test circuit inspects defects of the data lines of the display panel or defects of thin film transistors of the pixels, and detects the defects of the link lines respectively connected to the data lines, wherein the AP test circuit comprises:

a plurality of AP pads; and a plurality of AP switching elements having a one-to-one correspondence with the data lines such that each of the plurality of AP switching elements directly connects one of the data lines to one of the plurality of AP pads, wherein the plurality of AP switching elements are turned on when an AP test and a defect inspection for the link lines are conducted, wherein, when the defect inspection for the link lines is conducted, a positive (+) data voltage is applied to odd numbered AP pads among the plurality of AP pads, a negative (−) data voltage is applied to even numbered AP pads among the plurality of AP pads, and at least two of the plurality of multiplexer switching elements are turned on so that the positive (+) data voltage and the negative (−) data voltage are offset by each other through a short-circuit of the link lines, and wherein each of the at least two of the plurality of multiplexer switching elements is connected to both the odd numbered AP pad applied with the positive (+) data voltage and the even numbered AP pad applied with the negative (−) data voltage through the data lines, and pixels connected to the data lines supplied with an offset voltage display a dark image.

2. The display device according to claim 1, wherein the multiplexer supplies the data voltage from the data driver to the data lines of the display panel in a time-division manner.

3. The display device according to claim 1, wherein the multiplexer comprises:

a plurality of first multiplexer switching elements connected between each channel of the data driver and (3n−2)th data lines, and controlled by a first multiplexer (MUX) control signal, wherein n is a natural number, a plurality of second multiplexer switching elements connected between each channel of the data driver and (3n−1)th data lines, and controlled by a second MUX control signal, and a plurality of third multiplexer switching elements connected between each channel of the data driver and (3n)th data lines, and controlled by a third MUX control signal; and when the defect inspection for the link lines is conducted, wherein the multiplexer turns on the first multiplexer switching elements to drive the display panel, and detects an image darkly displayed in a form of a dark line on the display panel, the multiplexer turns on the second multiplexer switching elements to drive the display panel, and detects an image darkly displayed in the form of a dark line on the display panel, and the multiplexer turns on the third multiplexer switching elements to drive the display panel, and detects an image darkly displayed in the form of a dark line on the display panel.

4. The display device according to claim 3, wherein:

(6k−5)th data lines are connected to odd numbered channels of the data driver via a corresponding one of the first multiplexer switching elements, Tr1, wherein k is a natural number, (6k−4)th data lines are connected to even numbered channels of the data driver via a corresponding one of the second multiplexer switching elements, Tr2, (6k−3)th data lines are connected to odd numbered channels of the data driver via a corresponding one of the third multiplexer switching elements, Tr3, (6k−2)th data lines are connected to even numbered channels of the data driver via a corresponding one of the first multiplexer switching elements, Tr1, (6k−1)th data lines are connected to odd numbered channels of the data driver via a corresponding one of the second multiplexer switching elements, Tr2, and (6k)th data lines are connected to even numbered channels of the data driver via a corresponding one of the third multiplexer switching elements, Tr3.

5. The display device according to claim 1, wherein the multiplexer comprises a plurality of first multiplexer switching elements connected between each channel of the data driver and (3n−2)th data lines, and controlled by a first multiplexer (MUX) control signal, wherein n is a natural number, a plurality of second multiplexer switching elements connected between each channel of the data driver and (3n−1)th data lines, and controlled by a second MUX control signal, and a plurality of third multiplexer switching elements connected between each channel of the data driver and (3n)th data lines, and controlled by a third MUX control signal; and when the defect inspection for the link lines is conducted, the multiplexer turns on all of the first to third multiplexer switching elements to drive the display panel, and detects an image displayed in a form of a black block on the display panel.

6. The display device according to claim 5, wherein:

(6k−5)th data lines are connected to odd numbered channels of the data driver via a corresponding one of the first multiplexer switching elements, Tr1, wherein k is a natural number, (6k−4)th data lines are connected to even numbered channels of the data driver via a corresponding one of the second multiplexer switching elements, Tr2, (6k−3)th data lines are connected to odd numbered channels of the data driver via a corresponding one of the third multiplexer switching elements, Tr3, (6k−2)th data lines are connected to even numbered channels of the data driver via a corresponding one of the first multiplexer switching elements, Tr1, (6k−1)th data lines are connected to odd numbered channels of the data driver via a corresponding one of the second multiplexer switching elements, Tr2, and (6k)th data lines are connected to even numbered channels of the data driver via a corresponding one of the third multiplexer switching elements, Tr3.

7. The display device according to claim 1, wherein the multiplexer comprises:

a plurality of first multiplexer switching elements connected between each channel of the data driver and (2n−1)th data lines, and controlled by a first multiplexer (MUX) control signal, wherein n is a natural number; and a plurality of second multiplexer switching elements connected between each channel of the data driver and (2n)th data lines, and controlled by a second MUX control signal, when the defect inspection for the link lines is conducted, the multiplexer turns on all of the first and second multiplexer switching elements to drive the display panel, and detects an image darkly displayed in a form of a black block on the display panel.

8. The display device according to claim 7, wherein:

(4k−3)th data lines are connected to odd numbered channels of the data driver via a corresponding one of the first multiplexer switching elements, wherein k is a natural number, (4k−2)th data lines are connected to even numbered channels of the data driver via a corresponding one of the second multiplexer switching elements, (4k−1)th data lines are connected to odd numbered channels of the data driver via a corresponding one of the first multiplexer switching elements, and (4k)th data lines are connected to even numbered channels of the data driver via a corresponding one of the second multiplexer switching elements, Tr2.

9. The display device according to claim 1, wherein, when defect inspection for the link lines is conducted, data voltages are applied to the plurality of AP pads, respectively, and all of the switching elements of the multiplexer are turned on to drive the display panel such that detection of an image displayed in a form of a bright line on the display panel is conducted.

10. A method for detecting a data link line defect in a display device, in which a multiplexer and an auto-probe (AP) test circuit are disposed in a non-display area of a display panel at opposite sides of data lines, respectively, the method comprising:

turning on all of a plurality of AP switching elements in the AP test circuit, and applying a positive (+) data voltage to odd numbered AP pads among a plurality of AP pads in the AP test circuit while applying a negative (−) data voltage to even numbered AP pads among the plurality of AP pads, wherein the plurality of AP switching elements have a one-to-one correspondence with a plurality of data lines such that each of the plurality of AP switching elements directly connects one of the plurality of data lines to one of the plurality of AP pads; and turning on all switching elements of the multiplexer so that the positive (+) data voltage and the negative (−) data voltage are offset by each other through a short-circuit of the link lines and detecting a dark image displayed in a form of a black block on the display panel, wherein each of the switching elements of the multiplexer is connected to both the odd numbered AP pad applied with the positive (+) data voltage and the even numbered AP pad applied with the negative (−) data voltage through the data lines, and pixels connected to the data lines supplied with an offset voltage display the dark image.

11. The method according to claim 10, wherein, when the multiplexer includes a plurality of first multiplexer switching elements connected between each channel of a data driver and (3n−2)th data lines and controlled by a first multiplexer (MUX) control signal, a plurality of second multiplexer switching elements connected between each channel of the data driver and (3n−1)th data lines and controlled by a second MUX control signal, and a plurality of third multiplexer switching elements connected between each channel of the data driver and (3n)th data lines and controlled by a third MUX control signal, wherein the multiplexer turns on the first multiplexer switching elements to drive the display panel, and detects an image darkly displayed in a form of a dark line on the display panel;

the multiplexer turns on the second multiplexer switching elements to drive the display panel, and detects an image darkly displayed in the form of a dark line on the display panel; and the multiplexer turns on the third multiplexer switching elements to drive the display panel, and detects an image darkly displayed in the form of a dark line on the display panel, and wherein n is a natural number.

* * * * *